US012627819B2

(12) United States Patent
Hao et al.

(10) Patent No.: US 12,627,819 B2
(45) Date of Patent: May 12, 2026

(54) REDUCED VIDEO STREAM RESOURCE USAGE

(71) Applicant: Microsoft Technology Licensing, LLC, Redmond, WA (US)

(72) Inventors: Yichen Hao, Redmond, WA (US); Lihang Li, Bothell, WA (US); Anthony C. Romano, Lebanon, TN (US); Naiteek Sangani, Bothell, WA (US); Ryan S. Menezes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 507 days.

(21) Appl. No.: 17/968,694

(22) Filed: Oct. 18, 2022

(65) Prior Publication Data

US 2024/0129497 A1 Apr. 18, 2024

(51) Int. Cl.
  *H04N 19/177* (2014.01)
  *H04N 19/169* (2014.01)

(52) U.S. Cl.
  CPC ......... *H04N 19/177* (2014.11); *H04N 19/188* (2014.11)

(58) Field of Classification Search
  None
  See application file for complete search history.

(56) References Cited

U.S. PATENT DOCUMENTS 9,615,087 B2 4/2017 Amon et al.
10,403,326 B1 9/2019 Médioni et al.

10,616,465 B2 4/2020 Chowdhery et al.
2011/0267951 A1 11/2011 Stanwood
2015/0256835 A1* 9/2015 Sakai .................... G06F 16/786
375/240.25
2022/0070453 A1 3/2022 Tang et al.
2022/0086468 A1 3/2022 Hultqvist
2022/0094924 A1* 3/2022 Guo ..................... H04N 19/127

FOREIGN PATENT DOCUMENTS

CN 113114992 B 11/2021
CN 114154018 B 5/2022
IN 202041041376 A 10/2021

OTHER PUBLICATIONS

Laumer, et al., "A Compressed Domain Change Detection Algorithm for RTP Streams in Video Surveillance Applications", In Proceedings of IEEE 13th International Workshop on Multimedia Signal Processing, Oct. 17, 2011, 6 Pages. (Year: 2011).*
Canel, et al., "Scaling Video Analytics on Constrained Edge Nodes", In repository of arXiv:1905.13536v1, May 24, 2019, 13 Pages.
Dai, et al., "RESPIRE: Reducing Spatial-Temporal Redundancy for Efficient Edge-Based Industrial Video Analytics", In Proceedings of IEEE Transactions on Industrial Informatics, vol. 18, Issue 12, Dec. 2022, pp. 9324-9334.

(Continued)

*Primary Examiner* — Kaitlin A Retallick

(74) *Attorney, Agent, or Firm* — Rainier Patents, P.S.

(57) ABSTRACT

The description relates to resource aware object detection for encoded video streams that can identify frames of the video stream that include an object of interest, such as a human, without decoding the frames.

20 Claims, 8 Drawing Sheets

(56)                    References Cited

OTHER PUBLICATIONS

Elgamal, et al., "SiEVE: Semantically Encoded Video Analytics on Edge and Cloud", In repository of arXiv:2006.01318v1, Jun. 1, 2020, pp. 1-6.

Huang, et al., "An Efficient Optical Flow Based Motion Detection Method for Non-stationary Scenes", In repository of arXiv: 1811.08290v2, Nov. 21, 2018, 6 Pages.

Kaskavalci, et al., "A Deep Learning Based Distributed Smart Surveillance Architecture using Edge and Cloud Computing", In Proceeding of International Conference on Deep Learning and Machine Learning in Emerging Applications (Deep-ML), Aug. 26, 2019, pp. 1-6.

Kiryati, et al., "Real-time abnormal motion detection in surveillance video", In Proceedings of 19th International Conference on Pattern Recognition, Dec. 8, 2008, 4 Pages.

Lakshya, et al., "Compressed Domain Consistent Motion based Frame Scoring for IoT Edge Surveillance Videos", In Proceedings of International Symposium on Visual Computing, Oct. 3, 2021, 13 Pages.

Laumer, et al., "A Compressed Domain Change Detection Algorithm for RTP Streams in Video Surveillance Applications", In Proceedings of IEEE 13th International Workshop on Multimedia Signal Processing, Oct. 17, 2011, 6 Pages.

Laumer, et al., "Moving object detection in the H.264/AVC compressed domain", In Proceedings of APSIPA Transactions on Signal and Information, Jan. 31, 2016, pp. 1-20.

Muthuswamy, "Salient Motion Detection in Compressed Domain", In Proceedings of IEEE Signal Processing Letters, vol. 20, Issue 10, Oct. 2013, pp. 996-999.

Nguyen, et al., "Toward Scalable Video Analytics Using Compressed-Domain Features at the Edge", In Journal of Applied Sciences, vol. 10, Issue 18, Sep. 14, 2020, 21 Pages.

Pasandi, et al., "CONVINCE: Collaborative Cross-Camera Video Analytics at the Edge", In repository of arXiv:2002.03797v1, Feb. 5, 2020, 6 Pages.

Patel, Khushbu, "Motion Detection and Segmentation in H.264 Compressed Domain For Video Surveillance Application", In International Journal of Engineering Research & Technology (IJERT) vol. 3 Issue 4, Apr. 2014, pp. 1795-1799.

Szczerba, et al., "Fast Compressed Domain Motion Detection in H.264 Video Streams for Video Surveillance Applications", In Proceedings of Sixth IEEE International Conference on Advanced Video and Signal Based Surveillance, Sep. 2, 2009, pp. 478-483.

Tchaye-Kondi, et al., "SmartFilter: An Edge System for Real-Time Application-Guided Video Frames Filtering", In Proceedings of IEEE Internet of Things Journal ( Early Access ), Jul. 5, 2022, pp. 1-14.

Tian, et al., "Robust Privacy-Preserving Motion Detection and Object Tracking in Encrypted Streaming Video", In repository of arXiv:2108.13141v1, Aug. 30, 2021, 23 Pages.

Wei, et al., "A Block-wise frame difference method for real-time video motion detection", In International Journal of Advanced Robotic Systems, vol. 15, Issue 4, Jul. 5, 2018, pp. 1-13.

Yokoyama, et al., "Motion Vector Based Moving Object Detection and Tracking in the MPEG Compressed Domain", In Proceedings of Seventh International Workshop on Content-Based Multimedia Indexing, Jun. 3, 2009, pp. 201-206.

Zia, et al., "A scalable and secure model for surveillance cameras in resource constrained IoT systems", In Proceedings of the 4th International Conference on Cloud and Big Data Computing, Aug. 26, 2020, pp. 92-96.

International Search Report and Written Opinion received for PCT Application No. PCT/US23/033317, mailed on Jan. 8, 2024, 14 pages.

International Preliminary Report on Patentability received for PCT Application No. PCT/US2023/033317, mailed on May 1, 2025, 09 pages.

* cited by examiner

METHOD 300

METHOD <u>400</u>

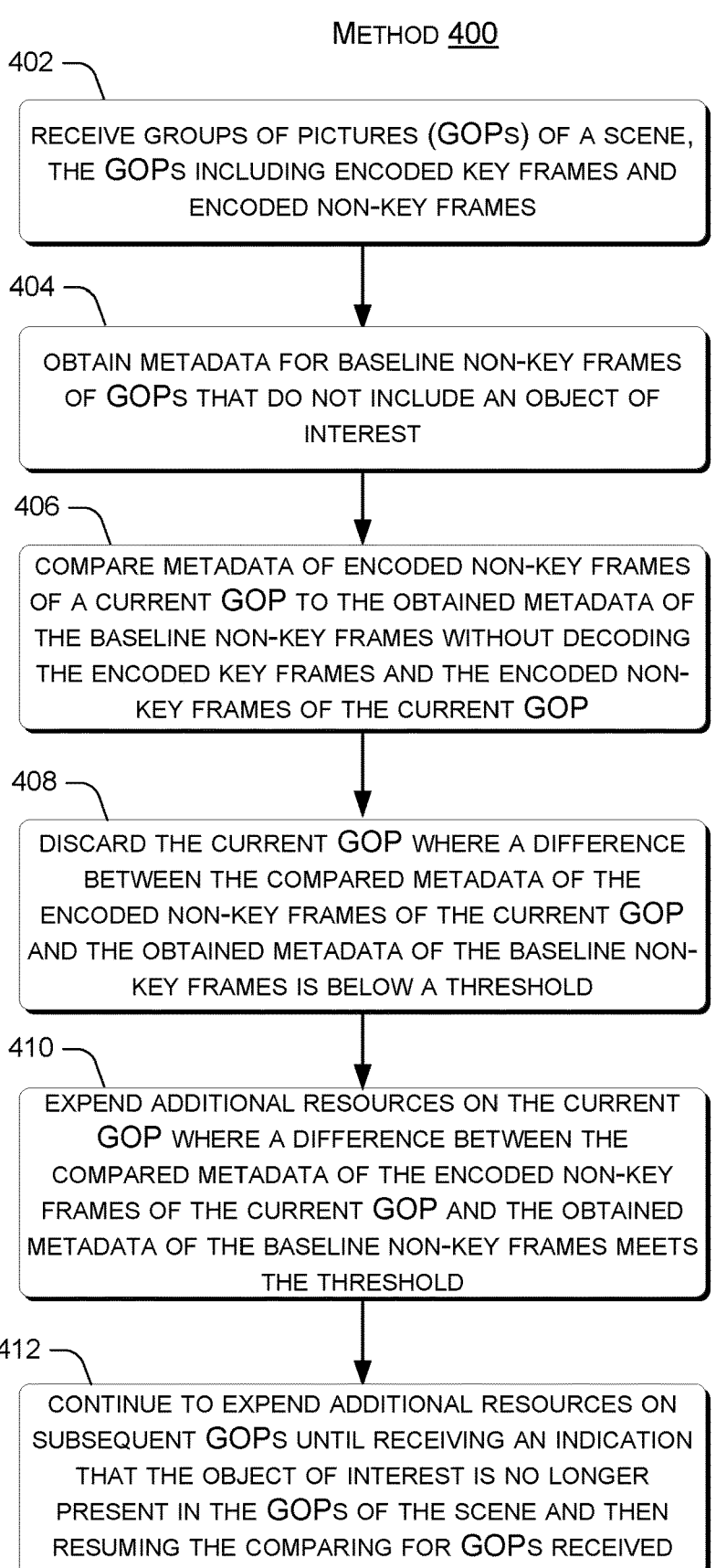

402 —

RECEIVE GROUPS OF PICTURES (GOPs) OF A SCENE, THE GOPs INCLUDING ENCODED KEY FRAMES AND ENCODED NON-KEY FRAMES

404 —

OBTAIN METADATA FOR BASELINE NON-KEY FRAMES OF GOPs THAT DO NOT INCLUDE AN OBJECT OF INTEREST

406 —

COMPARE METADATA OF ENCODED NON-KEY FRAMES OF A CURRENT GOP TO THE OBTAINED METADATA OF THE BASELINE NON-KEY FRAMES WITHOUT DECODING THE ENCODED KEY FRAMES AND THE ENCODED NON-KEY FRAMES OF THE CURRENT GOP

408 —

DISCARD THE CURRENT GOP WHERE A DIFFERENCE BETWEEN THE COMPARED METADATA OF THE ENCODED NON-KEY FRAMES OF THE CURRENT GOP AND THE OBTAINED METADATA OF THE BASELINE NON-KEY FRAMES IS BELOW A THRESHOLD

410 —

EXPEND ADDITIONAL RESOURCES ON THE CURRENT GOP WHERE A DIFFERENCE BETWEEN THE COMPARED METADATA OF THE ENCODED NON-KEY FRAMES OF THE CURRENT GOP AND THE OBTAINED METADATA OF THE BASELINE NON-KEY FRAMES MEETS THE THRESHOLD

412 —

CONTINUE TO EXPEND ADDITIONAL RESOURCES ON SUBSEQUENT GOPs UNTIL RECEIVING AN INDICATION THAT THE OBJECT OF INTEREST IS NO LONGER PRESENT IN THE GOPs OF THE SCENE AND THEN RESUMING THE COMPARING FOR GOPs RECEIVED AFTER THE INDICATION

FIG. 4

METHOD <u>500</u>

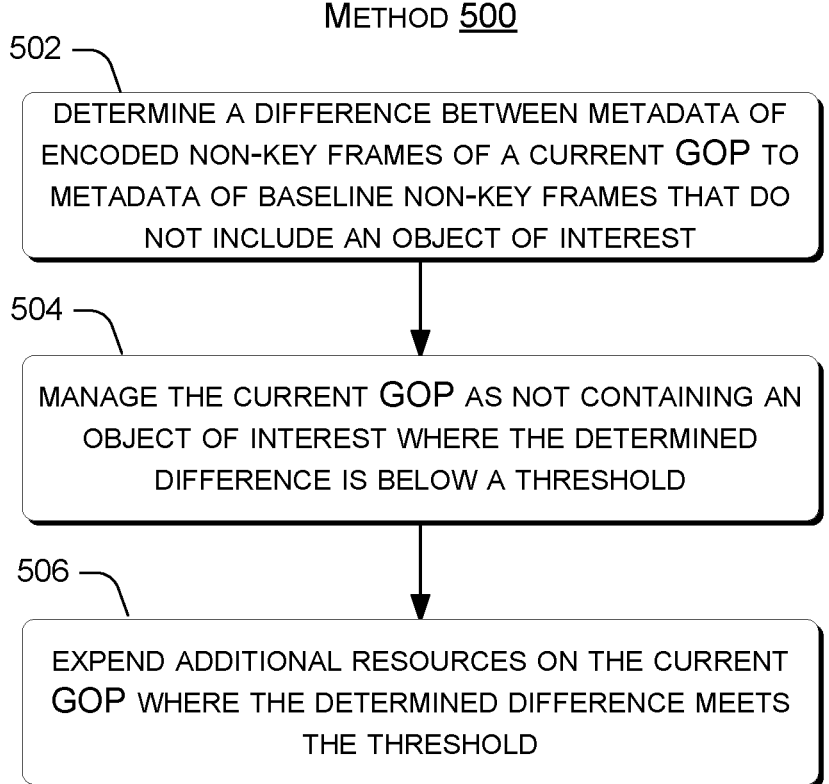

502 —

DETERMINE A DIFFERENCE BETWEEN METADATA OF ENCODED NON-KEY FRAMES OF A CURRENT GOP TO METADATA OF BASELINE NON-KEY FRAMES THAT DO NOT INCLUDE AN OBJECT OF INTEREST

504 —

MANAGE THE CURRENT GOP AS NOT CONTAINING AN OBJECT OF INTEREST WHERE THE DETERMINED DIFFERENCE IS BELOW A THRESHOLD

506 —

EXPEND ADDITIONAL RESOURCES ON THE CURRENT GOP WHERE THE DETERMINED DIFFERENCE MEETS THE THRESHOLD

FIG. 5

M ETHOD <u>600</u>

602 ⌐

OBTAIN FIRST PACKET SIZES OF ENCODED NON-KEY
FRAMES THAT ARE KNOWN TO NOT CONTAIN AN
OBJECT OF INTEREST

604 ⌐

OBTAIN SECOND PACKET SIZES OF CURRENT ENCODED
NON-KEY FRAMES

606 ⌐

DETERMINE WHETHER TO EXPEND RESOURCES ON
THE CURRENT NON-KEY FRAMES BY COMPARING THE
FIRST PACKET SIZES AND THE SECOND PACKET SIZES

REDUCED VIDEO STREAM RESOURCE USAGE

BACKGROUND

Cameras, such as security or surveillance cameras, capture large amounts of video, and often continuous streams of video. For instance, a security camera may continuously image the entrance to a building. In many cases, users are only interested when there is an object of interest, such as a human, animal, or vehicle in the video. As such, often a large percentage of this video contains nothing of interest to the users.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 3-6 show example flowcharts for accomplishing resource saving object detection concepts in accordance with some implementations.

DETAILED DESCRIPTION

Figure 1A:
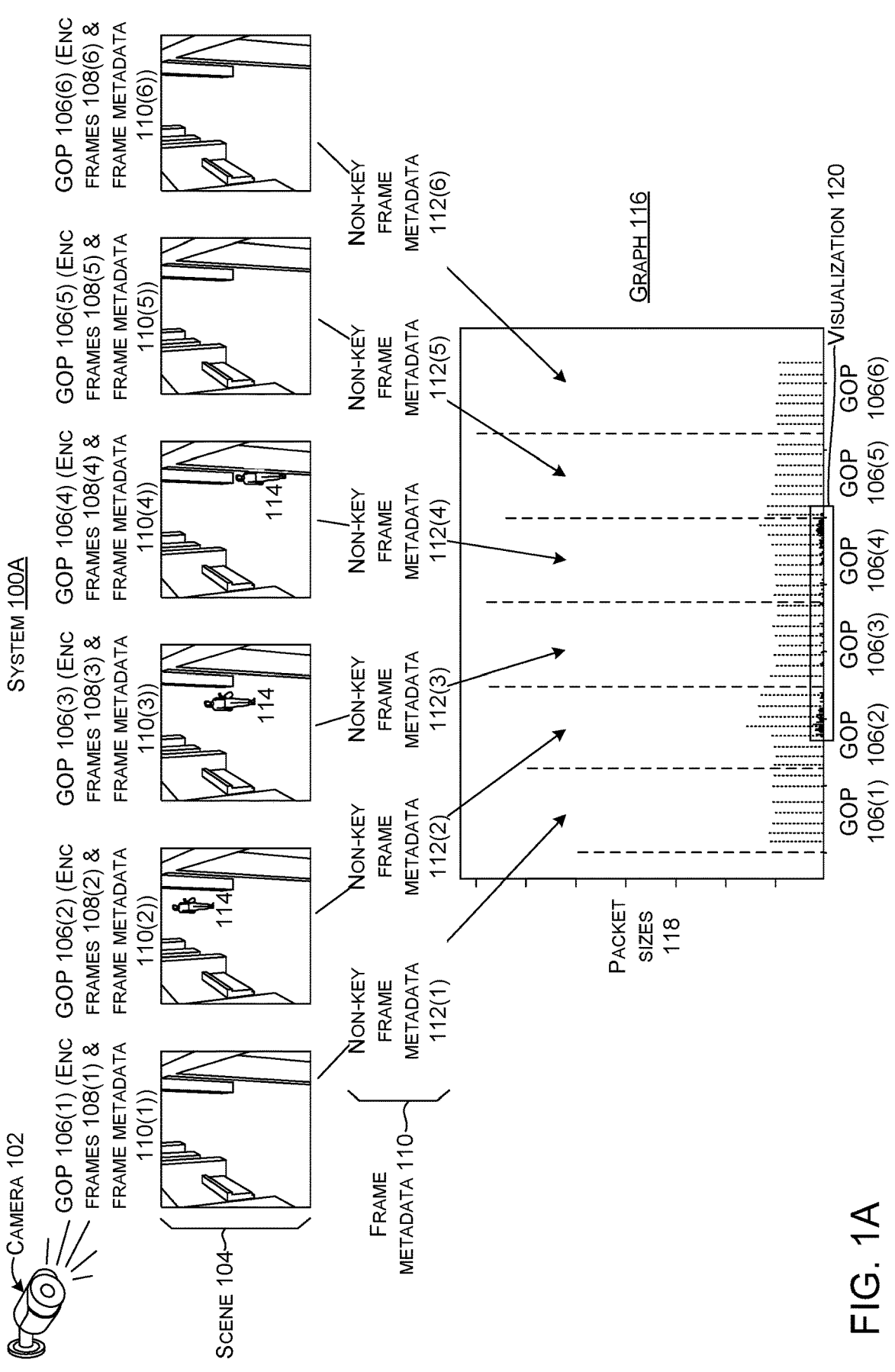
FIGS. 1A and 1B show an example system operating relative to an example scene to which some of the present resource saving object detection concepts can be applied.

This patent relates to cameras and video imaging scenarios. Often cameras are employed in a particular scene for a desired purpose, such as to detect when people are in the scene. Watching all of the video when the user is only interested in the subset of video when a person is present is burdensome and a waste of time. As such, automated processes have been developed to identify objects of interest in the video and only provide those portions of video to the user. However, these existing automated processes are extremely resource intensive. In these traditional processes, video is continuously captured and encoded as groups of pictures (GOPs). The GOPs include key frames, such as I frames and non-key frames, such as P and/or B frames. In these traditional processes, all of the encoded video is transmitted as GOPs over network resources, either locally or to remote locations. Processing resources are then utilized to decode the transmitted video (e.g., all of the GOPs). Additional processing resources are employed to detect (or not detect) objects of interest in the GOPs.

The present concepts solve this technical problem of undesirable resource usage by providing a technical solution that greatly reduces resource usage while still providing object detection. The technical solution includes an object detection resource gateway that distinguishes frames of GOPs that include objects of interest from those that do not include objects of interest without decoding the frames. Thus, resources, such as network resources, decoding resources, and/or detecting resources are employed on a smaller percentage (e.g., a subset) of GOPs and frames of the video stream. This technical solution is accomplished by examining metadata associated with the GOPs. Specifically, metadata of non-key frames of a GOP can be analyzed to accurately identify whether the frames of GOPs include an object of interest or not. Resources can be expended on the GOPs that include objects of interest. Other GOPs that do not include objects of interest can be discarded or otherwise allocated less resources.

This difference can be illustrated with an example use case scenario. Assume that a surveillance camera records a scene, such as a back entrance of a building for 24 hours. Assume further, that only one scene change occurs in those 24 hours. At one point, in a span of one minute a person (e.g., object of interest) walks up, opens the door, and enters the building. For the other for 23 hours and 59 minutes the scene is static (e.g., no object of interest is present). Existing techniques would handle encoded frames from the camera uniformly for the 24 hour period (e.g., resources would be used to transmit, decode, and attempt to detect objects of interest on all frames). In contrast, the present techniques could evaluate metadata of the encoded frames, identify the one minute period when the user entered the building, and expend additional resources on that one minute period and not the remaining 23 hours and 59 minutes of encoded frames. Thus, the present concepts provide a substantial technical solution for conserving resources relative to object detection in video streams.

Figure 1B:
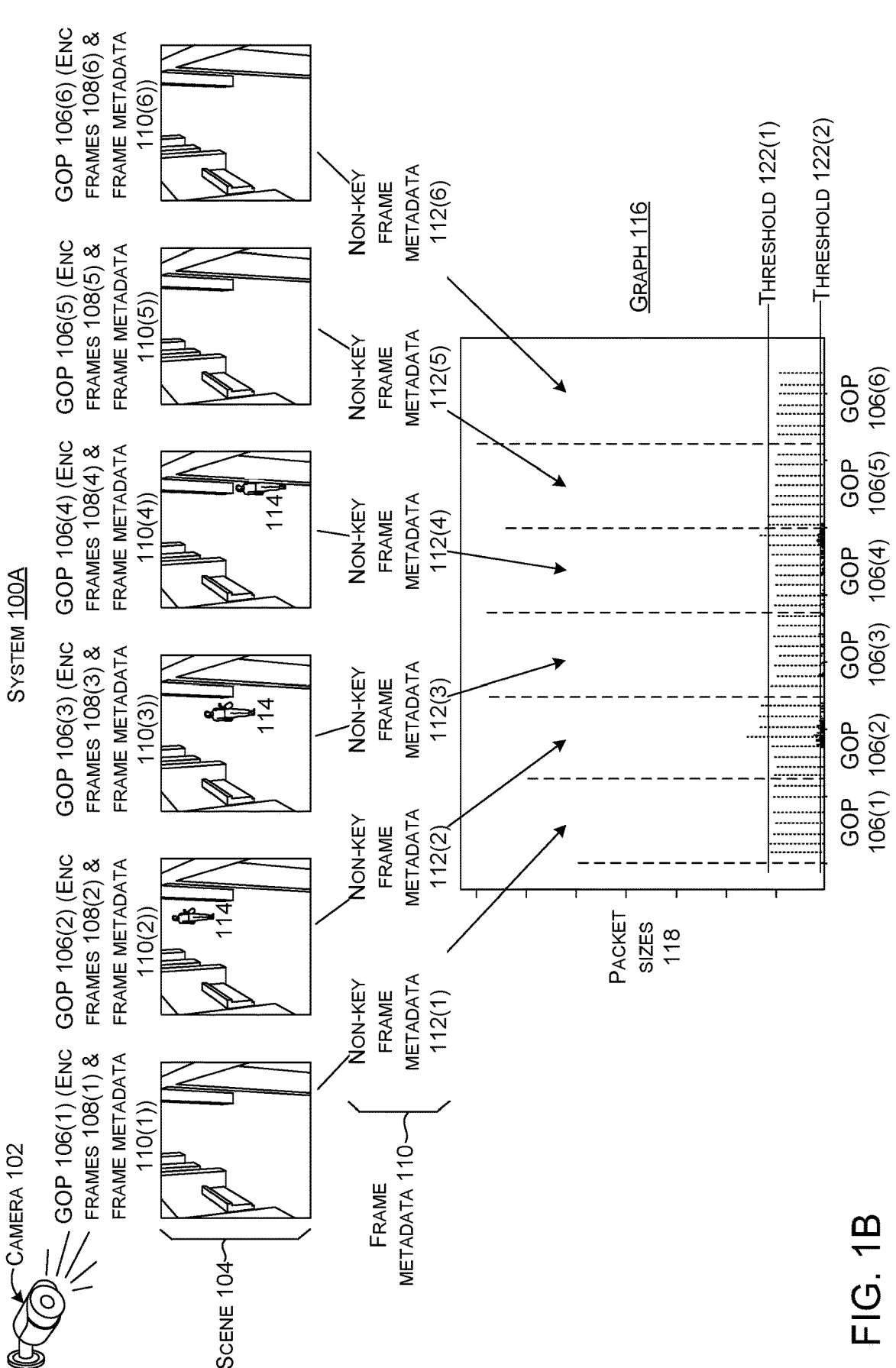

FIGS. 1A and 1B collectively show an example system 100A. A camera 102 captures video of a scene 104. In this case, the scene 104 is a hallway in a building. The video of the scene is encoded as a series of groups of pictures (GOPs) 106. Six GOPs (GOP106(1)-GOP106(6)) are represented for purposes of explanation and ease of illustration. (Note that the limitations of line drawings impose some simplification of the illustrated aspects). The video of the scene can be encoded utilizing various formats, such as real-time streaming protocol (RTSP) format, HTTP live streaming (HLS) format, web real-time communications (WebRTC) format, or secure reliable transport (SRT) format, among others.

Each GOP includes frames (e.g., image data) 108 and associated frame metadata 110. The image data of the frames 108 is in the form of a key frame and multiple non-key frames. From one perspective, a key frame can be viewed as a freestanding snapshot of the scene. The non-key frames only contain changes relative to the key frame of the GOP. As such, the non-key frames are not freestanding and relate to the key frame. The metadata 110 is data associated with each frame, such as source, time, packet size, etc. The present concepts can examine non-key frame metadata 112 to determine whether an object of interest 114 occurs in frames of the GOP 106. This aspect is represented graphically on graph 116. This graph 116 represents packet sizes on the vertical axis at 118. Dashed lines represent I frames, dotted lines represent P frames, and solid lines represent B frames. The GOPs 106 are shown sequentially along the horizontal axis.

The GOPs 106 are bounded by key frames, which have very large packet sizes, whether or not an object of interest 114 occurs in the individual GOP 106. In contrast, the packet sizes of non-key frame metadata 112 can be indicative of the presence or absence of objects of interest 114 in the individual GOP 106. However, this indication can be diluted if the packet sizes of the key frames are considered in the comparison. Thus, the present implementations can effectively determine whether objects of interest 114 occur in individual GOPs 106 by analyzing non-key frame metadata 112 including non-key frame packet size. This aspect is visualized generally at 120 relative to GOPs 106(2) through 106(4) where an object of interest is present in the scene 104 and which can be distinguished from GOPs 106(1), 106(5) and 106(6) where an object of interest is not present in the scene.

FIG. 1B shows details of one example technique for examining non-key frame packet sizes to determine if individual frames include an object of interest. In this case, the non-key frame packet sizes for frames that do not include an object of interest are utilized as a baseline. One or more thresholds 122 can be generated from these baseline non-key frames. Non-key frame packet sizes above the threshold can accurately indicate that the frames contain an object of interest. Example techniques for establishing the thresholds are described below beginning relative to FIG. 2.

In this case, the baseline non-key frame packet sizes are grouped into two clusters indicated by dotted lines and solid lines. A threshold 122 is set for each cluster. In this case, threshold 122(1) relates to the threshold for the larger frame packet sizes, which tend to be P frames and threshold 122(2) relates to the threshold for the smaller frame packet sizes, which tend to be B frames. When packet sizes of non-key frames in a GOP meet either or both of the thresholds 122, there is a high probability that the frames include an object of interest. As used herein, 'meet' or 'meeting' the threshold means equaling or exceeding the threshold. In this case, non-key frame packet sizes in GOPs 106(2) and 106(4) meet threshold 122(1) (e.g., dotted lines meet threshold 122(1)). Non-key frame packet sizes in GOPs 106(2), 106(3), and 106(4) meet threshold 122(2) (e.g., solid lines meet threshold 122(2)). Thus, the probability is high that these frames of GOPs 106(2)-106(4) include an object of interest and warrant resource usage relating to object detection. In contrast, packet sizes of non-key frames of GOPs 106(1), 106(5), and 106(6) indicate that they likely do not include an object of interest and do not warrant further resource expenditure. These aspects are described in more detail below starting with the description of FIG. 2.

Note that one of the concepts explained relative to FIGS. 1A and 1B is the ability to determine whether an object of interest occurs in an encoded frame without actually decoding the frame. This can produce large resource savings by only decoding frames that are likely to include an object of interest (e.g., not decoding frames that are unlikely to include an object of interest). The graphical representation of graph 116 provides a visual depiction to illustrate this aspect. Note that other implementations may employ different comparisons (e.g., thresholds) and/or the packet sizes may be different than those illustrated.

Figure 2:
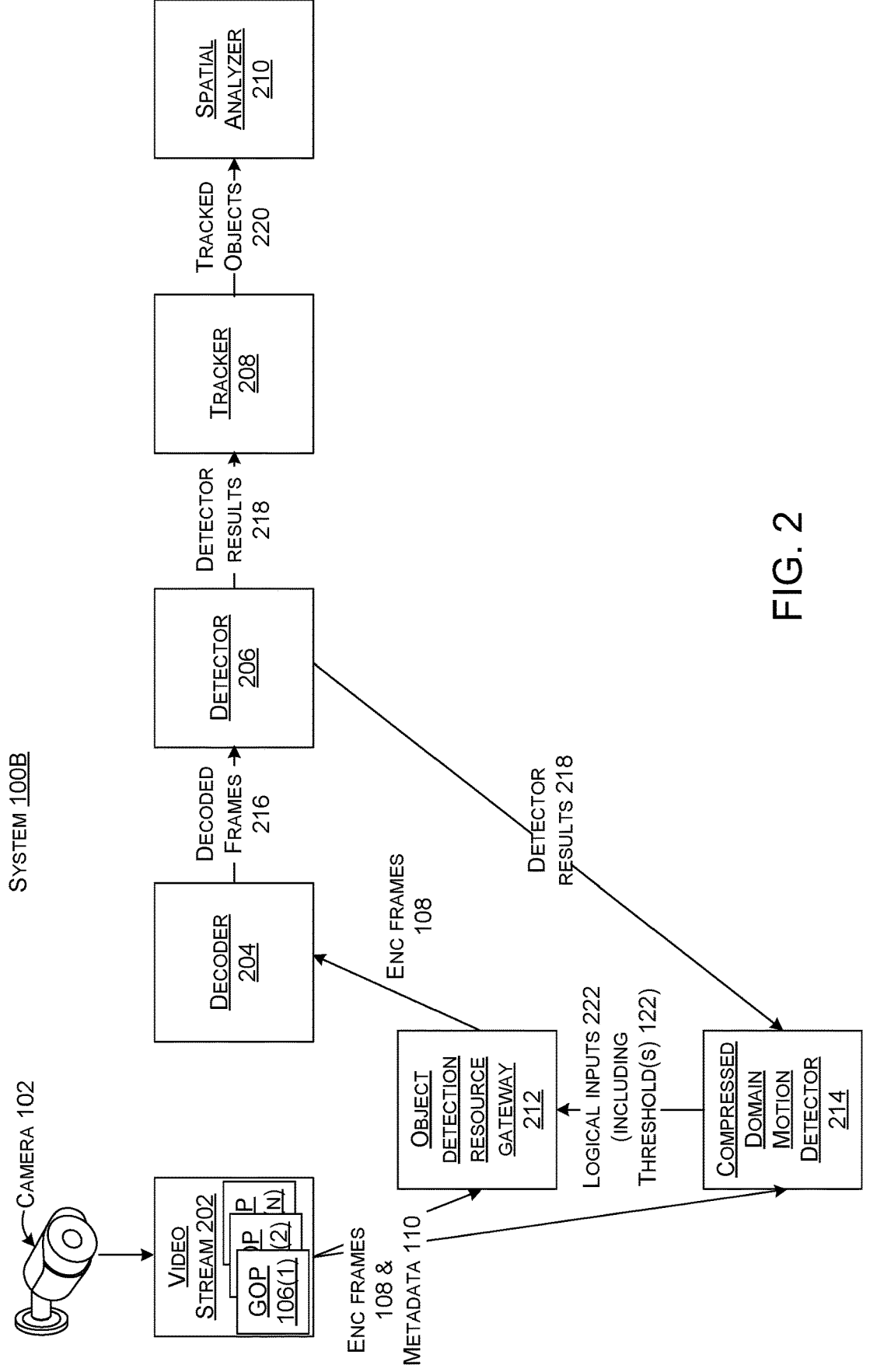
FIGS. 2 and 7 show example systems configured to employ the present resource saving object detection concepts in accordance with some implementations.

FIG. 2 shows example system 100B where video stream 202 is generated from images from camera 102. The video stream 202 entails multiple GOPs 106(1)-106(N), each of which includes encoded key and non-key frames 108 and associated metadata 110. The system includes a decoder 204, a detector 206, a tracker 208, a spatial analyzer 210, an object detection resource gateway 212, and a compressed domain motion detector 214.

Traditionally the entire video stream 202 (e.g., all encoded frames 108 of the GOPs 106) would be sent to the decoder 204. The decoder would decode the encoded frames and send the decoded frames 216 to the detector 206. The detector 206 would employ various techniques to detect objects in the decoded frames. The detector results 218 would be sent to tracker 208. The tracker 208 would employ various techniques to track movement of the detected objects across multiple decoded frames. The tracker 208 would send the tracked objects 220 to the spatial analyzer

210 to track movement of the objects over time (e.g., over GOPs). The GOPs identified as containing objects of interest could then be managed, such as by sending them to the user.

In contrast, the present implementations send the encoded frames 108 and associated metadata 110 of the GOPs 106 to the object detection resource gateway 212 and the compressed domain motion detector 214. The object detection resource gateway 212 and the compressed domain motion detector 214 work cooperatively to filter the GOPs based upon metadata and only send a subset of encoded frames to the decoder 204 that are likely to contain objects of interest.

The object detection resource gateway 212 filters the encoded frames 108 so that only a subset of the encoded frames 108 are transmitted to the decoder 204. The subset of the encoded frames that are transmitted to the decoder includes those encoded frames that have a relatively high likelihood of including an object of interest. The object detection resource gateway 212 can accomplish this utilizing information from the compressed domain motion detector 214 as will be described below. The object detection resource gateway 212 can distinguish the frames by comparing metadata of received frames to metadata of frames having a known status (e.g., known to include or not include an object of interest). As introduced above relative to FIGS. 1A and 1B, specific implementations compare the packet sizes of non-key frames of a current GOP to packet sizes of non-frames of GOPs having a known status (e.g., labelled baseline frames). One such example implementation is described in more detail directly below.

In this implementation the compressed domain motion detector 214 establishes a baseline by identifying GOPs with no object of interest. At start-up, the object detection resource gateway 212 sends encoded frames 108 of GOPs 106 to the decoder 204. The decoder 204 produces decoded frames 216, which are sent to the detector 206. The detector 206 can employ various techniques to identify objects of interest in (some of) the decoded frames. The detector 206 generates detector results 218 (e.g., an indication whether frames of a GOP include an object of interest or not).

The detector results 218 are sent to the compressed domain motion detector 214. The compressed domain motion detector 214 can leverage the metadata 110 of these known frames to identify the presence of objects of interest in other frames. The compressed domain motion detector 214 can identify the other frames that have objects of interest utilizing non-key frame packet size metadata values from the baseline frames that are known to not have objects of interest. In the example of FIG. 1A, the values could be generated from the packet sizes of non-key frames of GOPs 106(1), 106(5), and 106(6). The compressed domain motion detector 214 can calculate one or more thresholds 122 from these values (derived from packet sizes of non-key frames that are known to not include objects of interest). The compressed domain motion detector 214 can supply logical inputs 222 including the thresholds 122 to the object detection resource gateway 212. As introduced above, the object detection resource gateway 212 can utilize the thresholds 122 to determine which encoded frames 108 to send to the decoder 204.

Note that the object detection resource gateway 212 and the compressed domain motion detector 214 operate cooperatively to filter the frames for further resource usage (e.g., decoding) or not. Various configurations of the relationships and functionalities of these two components are contemplated. For instance, in the example above, the compressed domain motion detector 214 determines the thresholds and then the object detection resource gateway 212 applies the thresholds to the current frames to determine whether they receive additional resources or not. In an alternative case, the compressed domain motion detector 214 can both generate the thresholds and apply them to the current frames. The object detection resource gateway 212, in a subservient role, receives a listing of frame ids from the compressed domain motion detector 214 to send to the decoder (and/or other frame ids not to decode). Thus, the collective functionality of the object detection resource gateway 212 and the compressed domain motion detector 214 is to identify a subset of frames that are likely to include objects of interest and save resource usage on the remaining frames.

As mentioned above relative to FIGS. 1A and 1B, one facet of the metadata relating to non-key frame packet size can be highly determinative in relation to the presence of an object of interest. The object detection resource gateway 212 can utilize the threshold from the compressed domain motion detector 214 to evaluate the packet sizes of non-key frames of other GOPs, such as of a currently received GOP. Similarity of packet size between the current non-key frames and the known (no object of interest baseline) non-key frames is an accurate indication that the current frames do not include an object of interest. If the packet sizes are similar (e.g., below the threshold), then the resources dedicated to this GOP can be curtailed. For instance, the object detection resource gateway 212 can curtail resource usage by discarding the GOP.

On the other hand, if the packet sizes are dissimilar in that the current non-key frame packet sizes meet the threshold, the object detection resource gateway 212 can expend additional resources on the frames of the current GOP. For instance, object detection resource gateway 212 can send the encoded frames to the decoder 204, which can decode the frames and send the decoded frames to the detector 206 for further analysis related to object detection. Recall that non-key frames are not self-contained frames and instead relate to a key frame of the GOP, thus if the object detection resource gateway 212 determines that a non-key frame includes an object of interest based upon the threshold comparison, the object detection resource gateway 212 can send both the non-key frames and the associated key frame of the GOP to the decoder 204. In practice, the object detection resource gateway 212 may send the entire GOP that includes the non-key frame that meets the threshold to the decoder 204.

At this point, once the object detection resource gateway 212 handles the GOP that includes the non-key frame that has a packet size that meets the threshold, several potential strategies are available. First, the object detection resource gateway 212 could continue to send subsequent encoded frames to the decoder 204 for object detection until the detector 206 indicates that there is no longer an object of interest in the decoded frames.

Second, the object detection resource gateway 212 could stop sending subsequent frames to the decoder 204 when, once again, the metadata similarity indicates that the frames do not include an object of interest. Third, the object detection resource gateway 212 can also employ a hybrid approach that utilizes the similarity as an indication that the object of interest is no longer in the frames, but continues to send frames to the decoder 204 and detector 206 for verification. This hybrid configuration provides feedback to allow the compression domain motion detector 214 to dynamically refine the threshold. For instance, compressed domain motion detector 214 could initially set the similarity threshold of 0.8 between the non-key frame packet size and the known non-key frame packet size. Over time, the compression domain motion detector 214 can use the feedback to refine the threshold to, for example, 0.9 for reliable determination while reducing false positives. Once the detector results indicate the object of interest, the object detection resource gateway 212 can begin to filter new GOPs with the refined threshold.

Figure 3:
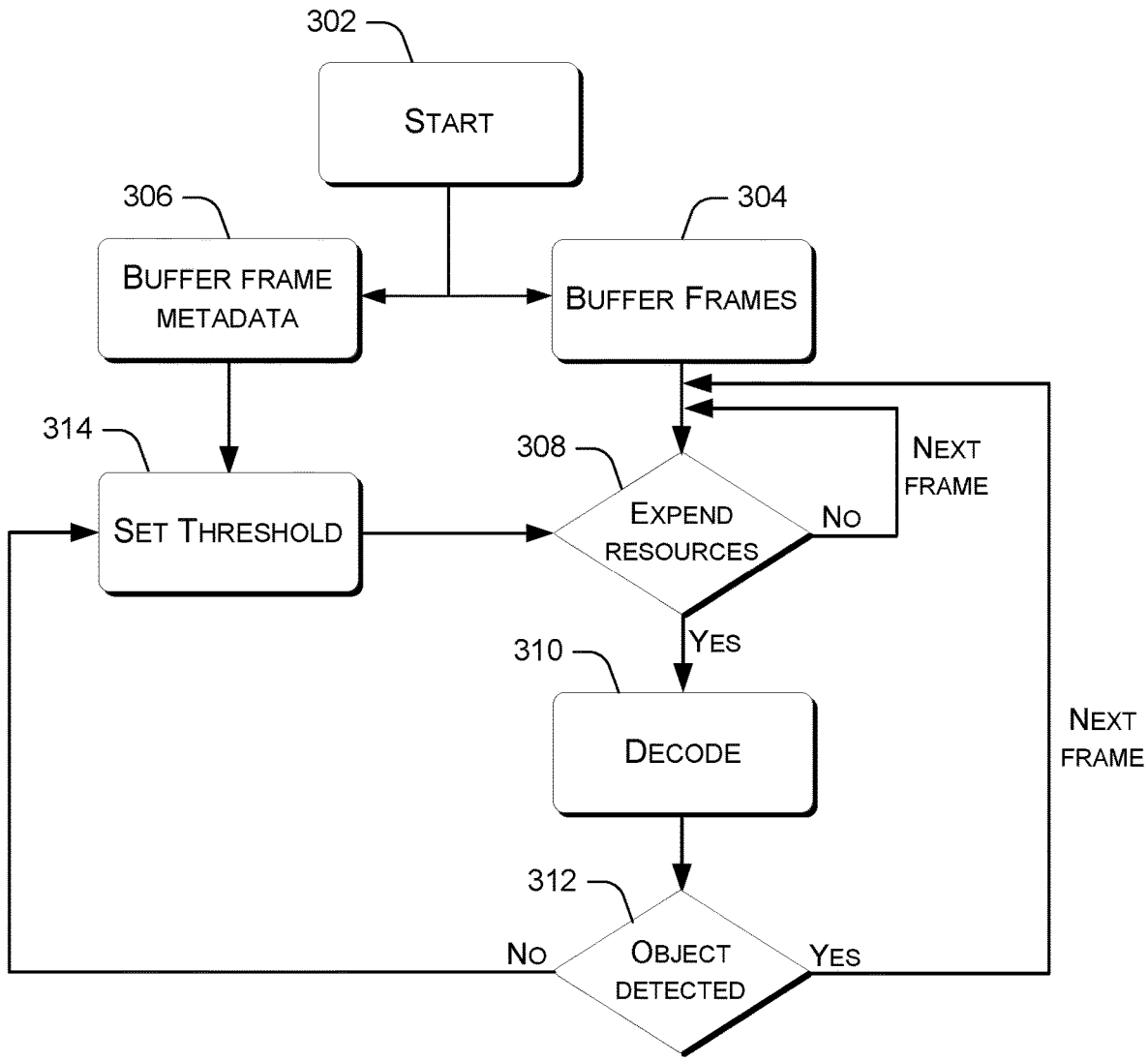

FIG. 3 shows a flowchart of an example object detection resource conserving method 300. The method starts at 302. Encoded frames are buffered in a queue at 304 and corresponding frame metadata is buffered in a queue at 306. As mentioned above, the frame metadata can entail the packet size of non-key frames, among other aspects. The encoded frames and the corresponding frame metadata can be correlated through frame identifications (ids). Thus, in one implementation, the packet size of non-key frames are buffered with their frame id in a queue at 306 as [(frame_id$_0$, packet_size$_0$), (frame_id$_1$, packet_size$_1$), (frame_id$_2$, packet_size$_2$), . . . (frame_id$_n$, packet_size$_n$)]. The corresponding packets (e.g., having the same id) are in a separate queue at 304.

At 308 a decision is made whether to expend resources on an individual buffered frame (e.g., whether to open the gateway). At startup this query is answered affirmatively (e.g., yes at 308) and the method proceeds to 310 where frame decoding is performed. Object detection techniques are employed on the decoded frames at 312. If an object is detected in the decoded frame (e.g., yes at 312), the method returns to block 308 where the process is repeated on the next frame.

When there is no object of interest (e.g., no at 312) the proccess moves to 314 to set (e.g., at this point initialize) a non-key frame packet size threshold. For instance, if there is no object of interest for a series of at least m frames, the method can select the packet sizes [(frame_id$_r$, packet_size$_r$), (frame_id$_{r+1}$, packet_size$_{r+1}$), (frame_id$_{r+2}$, packet_size$_{r+2}$), . . . (frame_id$_{r+m-1}$, packet_size$_{r+m-1}$)]. Thus, the threshold is set utilizing frames that object detection has shown not to include objects of interest (e.g., 'known' or 'baseline' frames are utilized to set the packet size threshold).

One implementation for setting the non-key frame packet size threshold sorts the sampled packet sizes [sizer, sizer+1, sizer+2, . . . sizer+m−1]. This implementation finds the biggest gap between the sorted numbers. The implementation splits the packet sizes into two groups at the biggest gap. The implementation calculates the mean and the standard deviation of each group (low and high). This produces two thresholds as was illustrated relative to FIG. 1B.

Once the threshold is set at 314, the threshold and the packet sizes of subsequent non-key frames are used at 308 in the determination whether to expend resources on other existing and/or subsequent encoded frames. The existing encoded frames can include frames that are presently in the buffers and if their values are smaller than the threshold they can be removed from the buffers to free up space for subsequent frames. The packet sizes of these subsequent non-key frames can then be compared to the thresholds.

Another example that utilizes the low and high threshold groups established above can compare subsequent non-key frame metadata to the low and high mean and standard deviations. In this case, if two consecutive non-key frames have packet sizes in the range of [low_mean+ low_multiplier*low_std, high_mean− high_multiplier*high_std] or [high_mean+ high_multiplier*high_std, inf], they meet the thresholds. This outcome would produce a 'yes' determination at 308 and the method would proceed to 310 for these subsequent non-key frames. Note that the implementation described directly above is triggered by two consecutive non-key frames meeting the thresholds, other implementations could utilize a single instance of a non-key frame meeting the threshold as a trigger or three or more consecutive non-key frames could be used as the trigger.

These configurations allow patterns of the associated packet sizes to be learned and applied to initialization of the threshold. The method takes in encoded video frames and detector results asynchronously. This may result in the packet size/frame id buffer containing frames that have not undergone object detection at 312. Therefore, the method can check the rest of the buffer [(frame_id$_{r+m}$, packet_size$_{r+m}$) . . . ] to see if any packet size meets the threshold. If not, the resource expenditure query 308 can stop sending frames for decoding at 310 to reduce resource usage. This aspect was controlled by the object detection resource gateway 212 in system 100B of FIG. 2. In contrast, when the packet size of the new or subsequent non-keyframe meets the threshold at 308, additional resources can be employed by decoding the frame at 310 and performing object detection at 312.

The description that follows elaborates on example compressed domain motion detection algorithms for setting the non-key frame packet size threshold(s) and employing the thresholds to determine which frames to expend further resources. These implementations employ several configuration parameters and private instance variables. An int motion_frame_candidate_counter_threshold parameter is a number of consecutive motion frame candidates to trigger the motion event. Examples are described above that use 1, 2, or more consecutive frames over the threshold. An int min_packet_size_buffer_size parameter is a minimum number of packet sizes used to initialize the thresholds. A float low_threshold_multiplier parameter is a number multiplier to set the lower packet size thresholds. A float high_threshold_multiplier parameter is a multiplier to set the higher packet size thresholds. The private instance variables can include boolean is_filtering, which is a variable relating to whether the thresholds are Initialized and ready to filter frames. A first in first out (FIFO) queue with max length packet_size_buffer is a buffer queue that stores tuples of frame id and its corresponding packet size. An int motion_frame_candidate_counter is a variable that counts the number of consecutive motion frame candidates. An int last_frame_with_detections variable is the frame id of the last frame with detections. A float low_mean, low_std, high_mean, high_std variable relates to calculated packet size thresholds.

The compressed domain motion detection algorithms can employ helper functions. The first helper function can include boolean TrySettingThresholds(int current_frame_id)

/*

This helper function calculates the packet size thresholds as described in compressed domain motion detection (CD-MD) Packet Size Threshold Calculation. It then checks if the rest of the packet_size_buffer is within the thresholds. It returns True if the thresholds are valid and the rest of the buffer is within the thresholds, and False otherwise.

*/

SELECT elements of packet_size_buffer WHERE current_frame_id>=frame id>last_frame_with_detections SORT the packet sizes of the selected elements FIND the biggest gap between the sorted packet sizes SPLIT the packet sizes into two groups (low and high)

CALCULATE the mean and std of each group

SET low_mean, low_std, high_mean, high_std according to the calculation

CHECK if the rest of the packet_size_buffer triggers a motion event Return True if all the above succeed and False otherwise Boolean CheckThresholds(int packet_size)

/*

This helper function checks if the frame with packet_size is a motion frame candidate.

*/

Return (high_mean–high_threshold_multiplier*high_std>packet_size> low_mean+low_threshold_multiplier*low_std OR packet_size>high_mean+ high_threshold_multiplier*high_std)

Functions

The compressed domain motion detection algorithm can include various functions.

One function includes: boolean OnEncodedFrame(int frame_id, boolean is_key_frame, int packet_size):

```
/*
It is an asynchronous message handler for newly received
encoded video frames. It takes in the frame id, key frame flag, and
packet size information of the new encoded video frame and
returns a boolean value indicating whether a motion event is
triggered.
*/
If is_key_frame
Return NOT is_filtering
Endif
If is_filtering
    If CheckThresholds(packet_size)
        INCREMENT
    motion_frame_candidate_counter by 1
      Else
        RESET motion_frame_candidate_counter to 0
      Endif
      If motion_frame_candidate_counter >=
    motion_frame_candidate_counter_threshold
        SET is_filtering to False
        RESET packet size thresholds to default values
        Return True
      Endif
    Return False
    Endif
    APPEND (frame_id, packet_size) to packet_size_buffer
    Return True
```

Another function includes void OnDetectionResult(int frame_id, boolean has_detections)

```
*/
It is an asynchronous message handler for newly received
detection results from the deep learning-based detector model. It
gets the information on whether the frame with frame_id has
detections and updates the internal states correspondingly.
*/
If has_detections:
    UPDATE last_frame_with_detections to frame_id If frame_id
is larger
    REMOVE elements of packet_size_buffer earlier than
frame_id
Else
    If not is_filtering
      If frame_id – last_frame_with_detections >=
min_packet_size_buffer_size
        If TrySettingThresholds(frame_id)
          SET Is_filtering to True
        Endif
      Endif
```

-continued

```
    Endif
Endif
```

This aspect is also described in Table 1, which relates to an example compressed domain motion detection algorithm.

TABLE 1

```
 1:    Fixed-length FIFO Queue: buffer
 2:    float: lowMean, lowStd, highMean, highStd
 3:    float: lowMultiplier, highMultiplier
 4:
 5:    void SetThresholds(int array: packetSizes) {
 6:        SORT packetSizes
 7:        FIND the biggest gap between packetSizes
 8:        SPLIT packetSizes into LOW and HIGH at the biggest gap
 9:        lowMean ← math.mean(LOW)
10:        lowStd ← math.std(LOW)
11:        highMean ← math.mean(HIGH)
12:        highStd ← math.std(HIGH)
13:    }
14:
15:    boolean CheckThresholds(int packetSize) {
16:        return (highMean – highMultiplier * highStd > packetSize >
               lowMean + lowMultiplier * lowStd)
17:            OR (packetSize > highMean + highMultiplier * highStd)
18:    }
19:
20:    boolean main ( ) {
21:        APPEND (frame id, packet size) of encoded frames to buffer
22:        SetThresholds(buffer[frames with no detections])
23:        If CheckThresholds(packet size of the new frame)
24:            SEND new frame
25:        Else
26:            DROP new frame
27:        Endif
28:        REPEAT
29:    }
```

This compressed domain motion detection algorithm avoids sending all encoded frames for processing. Instead, the encoded frames are filtered without decoding and those with a high probability of relating to a scene change (e.g., object of interest) can be allocated additional resources, while saving resource usage on encoded frames with a low probability of relating to a scene change. This is accomplished by examining the packet sizes of non-key frames. One or more thresholds relating to packet size of non-key frames can be established with baseline images of the scene that do not relate to a scene change (e.g., do not contain an object of interest). If the packet sizes of non-key frames of a current GOP meet the threshold, the GOP has a high probability of relating to a scene change (e.g., an object of interest entered the scene). The implementations described above can produce above 90 percent detection of scene changes without decoding the frames. Accuracy can be increased even higher, such as to above 95 percent, by adjusting the threshold (e.g., lower the threshold). The increased accuracy may result in slightly higher resource usage (e.g., false positives causing resources to be expended on encoded frames that do not actually contain an object of interest). Further, the resource expenditure on the frames that are decoded and have object detection performed on them can be used as a feedback loop mechanism to tune the threshold.

Beyond the feedback loop mechanism, the present implementations can allow a user to adjust this accuracy versus resource usage tradeoff as desired for a particular use case. For instance, a user interested in ensuring they never miss objects of interest at the scene can prioritize accuracy over resource savings and can lower the threshold. Conversely, a user interested in resource savings can raise the threshold. Further, the present implementations can offer easy dynamic adjustments to the user, such as on a dashboard that shows the tradeoffs between resource usage and accuracy.

Implementations are described above for reducing resource usage associated with object detection in video streams. Example results are provided below in Table 2 and Table 3 which both relate to five video samples (e.g., samples 1-5).

Table 2 includes columns for the number of video frames in each sample, the number of frames with detections (obtained via decoding and detecting), the number of frames without detections (obtained via decoding and detecting), the number of frames discarded via metadata analysis of encoded frames, number of frames with detections via metadata analysis of encoded frames, and the recall of frames with detections.

For instance, sample 1 includes 9743 frames. When all frames are decoded and then detection is performed on the decoded frames, objects of interest were detected in 1556 frames and not in the other 8187 frames. Utilizing the present metadata analysis of encoded frames techniques, out of the 9743 frames, 4094 frames were identified as not including objects of interest and were discarded. The other 5649 frames were decoded and object detection was performed on them. Out of the 5649 frames that the present metadate comparison was performed on and selected to decode and run detections on, 1505 frames actually had detections (object of interest). The last column shows the recall between the detection without decoding (e.g., 1505 frames) and the actual number of frames with objects (e.g., 1556 frames) for a correlation of 96.72 percent. The recall is calculated through dividing the number of frames with detections when only the selected frames are processed by the number of frames with detections when every frame is processed (ground truth). In this example, the recall is 1505 divided by 1556, which is about 96.72%. As mentioned above, the mount of resource savings versus recall on detection can be adjusted by adjusting the threshold.

TABLE 2

| Video | # of frames | # of frames with detections (Truth) | # of frames without detections (Truth) | # of frames discarded | # of frames with detections (compressed domain motion detect) | Recall of frames with detections |
|---|---|---|---|---|---|---|
| Sample 1 | 9743 | 1556 | 8187 | 4094 | 1505 | 96.72% |
| Sample 2 | 10610 | 4352 | 6258 | 4243 | 4308 | 98.99% |
| Sample 3 | 8485 | 1241 | 7244 | 4692 | 1176 | 94.76% |
| Sample 4 | 10408 | 1846 | 8562 | 5024 | 1761 | 95.40% |
| Sample 5 | 13138 | 3471 | 9667 | 8696 | 2553 | 73.55% |

Table 3 includes columns for reduction in cost of processing percent of frames without detections, packet size of all frames, packet size of discarded frames, packet size of frames kept for processing, and percent network bandwidth usage is reduced.

In relation to sample 1, the reduction in cost of processing is 50.01 percent. This number is calculated from values in Table 2 relating to the number of frames discarded with metadata analysis of encoded frames (e.g., object detection resource gateway) (4094 frames) divided by the number of frames decoding and detection indicated did not have objects of interest (8187) for a savings of 50.01 percent. Looking at the next column, the packet sizes of all the frames of sample 1 combined is 167,306,148 bytes. Looking at the next two columns, the combined packet sizes of the frames discarded by metadata analysis of encoded frames (e.g., object detection resource gateway) is 70,504,052. The combined size of the packets of the frames that metadata analysis of encoded frames indicated may include objects of interest is 96,802,096. The last column represents network bandwidth saving associated with not transmitting the packets that were discarded (e.g., 70,504,052 divided by 167,306,148, which is the combined packet size of all packets equals 42.14 percent). Thus, relative to sample 1, employing metadata analysis of encoded frames (e.g., object detection resource gateway) saved 50.01 percent on processing resource usage and 42.14 percent on network bandwidth resource usage.

Block 408 can discard the current GOP where a difference between the compared metadata of the encoded non-key frames of the current GOP and the obtained metadata of the baseline non-key frames is below a threshold. Discarding can entail removing the current GOP from buffers and/or storage. In some cases, the current GOP may be removed from the buffer, but be maintained in storage for a period of time. For instance, operating definitions may store all GOPs for three days or a week, for instance, to allow review by a user if desired, regardless of scene content.

Block 410 can expend additional resources on the current GOP where a difference between the compared metadata of the encoded non-key frames of the current GOP and the obtained metadata of the baseline non-key frames meets the threshold. The additional resources can include transmitting resources (e.g., network bandwidth resources), processing resources (e.g., decoding and/or detecting) and/or storage resources.

Block 412 can continue to expend additional resources on subsequent GOPs until receiving an indication that the object of interest is no longer present in the GOPs of the scene and then resuming the comparing for GOPs received after the indication. In this implementation, the method is not required to definitively identify when the object of interest is no longer in the frames. Instead, the method can continue to expend additional resources to have decoding and detection performed on the frames until receiving feed-

TABLE 3

| Video | Reduction in the cost of processing % frames without detections | Packet size of all frames (byte) | Packet size of discarded frames (byte) | Packet size of frames kept for processing (byte) | Reduction in the Network Bandwidth Usage by |
|---|---|---|---|---|---|
| Sample 1 | 50.01% | 167306148 | 70504052 | 96802096 | 42.14% |
| Sample 2 | 67.80% | 190565452 | 70414912 | 120150540 | 36.95% |
| Sample 3 | 64.77% | 144813045 | 79720024 | 65093021 | 55.05% |
| Sample 4 | 58.68% | 169488717 | 81209433 | 88279284 | 47.91% |
| Sample 5 | 89.96% | 207143877 | 131084837 | 76059040 | 63.28% |

Several implementations are described in detail above. FIG. 4 shows another example object detection resource gateway method or technique 400.

Block 402 can receive groups of pictures (GOPs) of a scene. The GOPs including encoded key frames and encoded non-key frames. The GOPs can be captured and encoded by a device performing the method, such as a camera. Alternatively, the method can be performed by a device that receives the GOPs directly or indirectly from the camera.

Block 404 can obtain metadata for baseline non-key frames of GOPs that do not include an object of interest. The baseline non-key frames can be identified utilizing a decoder and detector. Alternatively, a human could evaluate the frames and make the determination whether objects of interest occurred in the frames. The metadata can relate to various parameters. Example parameters described above relate to packet sizes of the non-key frames. In some configurations, a threshold can be established from the metadata parameter values of the baseline non-key frames.

Block 406 can compare metadata of encoded non-key frames of a current GOP to the obtained metadata of the baseline non-key frames. For instance, the comparison can relate to comparing the metadata values of the current encoded non-key frames to the metadata values of the baseline non-key frames (e.g., to the threshold).

back that the frames no longer contain an object of interest (e.g., no object of interest detected by the detector).

FIG. 5 shows an example object detection resource gateway method or technique 500.

Block 502 can determine a difference between metadata of encoded non-key frames of a current GOP to metadata of baseline non-key frames that do not include an object of interest.

Block 504 can manage the current GOP as not containing an object of interest where the determined difference is below a threshold. The threshold can be based on information from the baseline non-key frames. For instance, the threshold can be an average value from the baseline non-key frames. Other configurations are described above.

Block 506 can expend additional resources on the current GOP where the determined difference meets the threshold.

Figure 6:
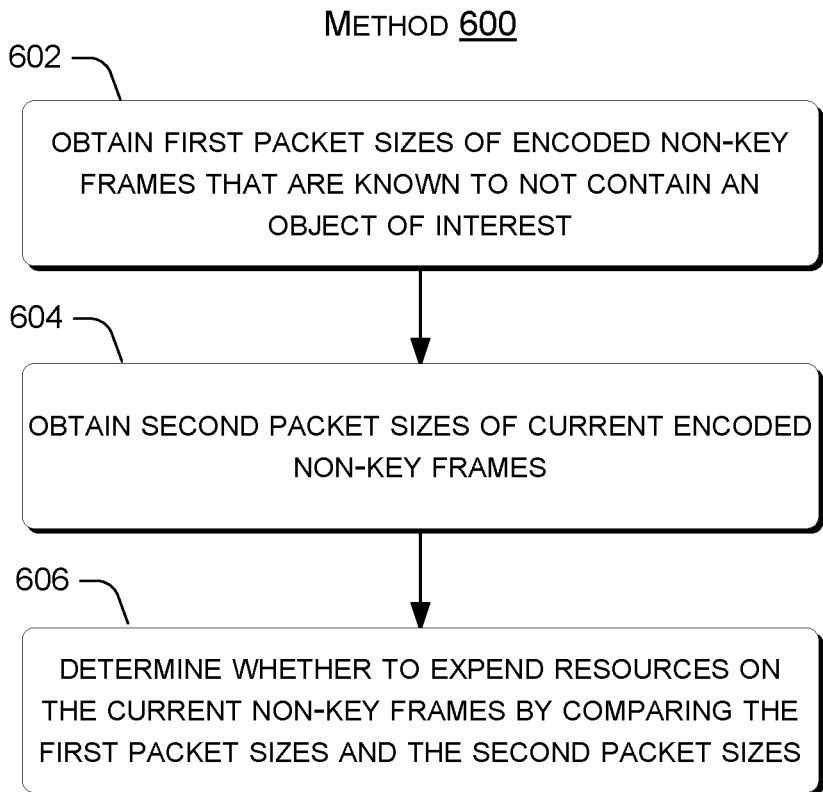

FIG. 6 shows an example object detection resource gateway method or technique 600.

Block 602 can obtain first packet sizes of encoded non-key frames that are known to not contain an object of interest. These first packets can be baseline frames that have been decoded and object detection performed on the decoded frames indicates that no objects of interest are present.

Block 604 can obtain second packet sizes of current encoded non-key frames. The current encoded non-key frames can be from current GOPs of a video stream.

Block 606 can determine whether to expend resources on the current non-key frames by comparing the first packet sizes and the second packet sizes. The comparison can indicate whether the first packet sizes are larger than the second packet sizes. Larger packet size of non-key frames is a reliable and accurate indicator that the current frames include objects of interest and the comparison can be made without decoding the current frames until after the comparison is completed.

Stated another way, the current implementations can distinguish when a scene captured in a video stream is relatively stable and not decode frames during that time. The implementations can detect when the scene changes, e.g., when an object of interest enters the scene. At this point, these implementations can start to decode frames of the video stream. The decoding can continue until the scene is once again relatively stable (e.g., the object of interest leaves the scene). At this point, the decoding can be stopped pending a subsequent scene change.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 7:
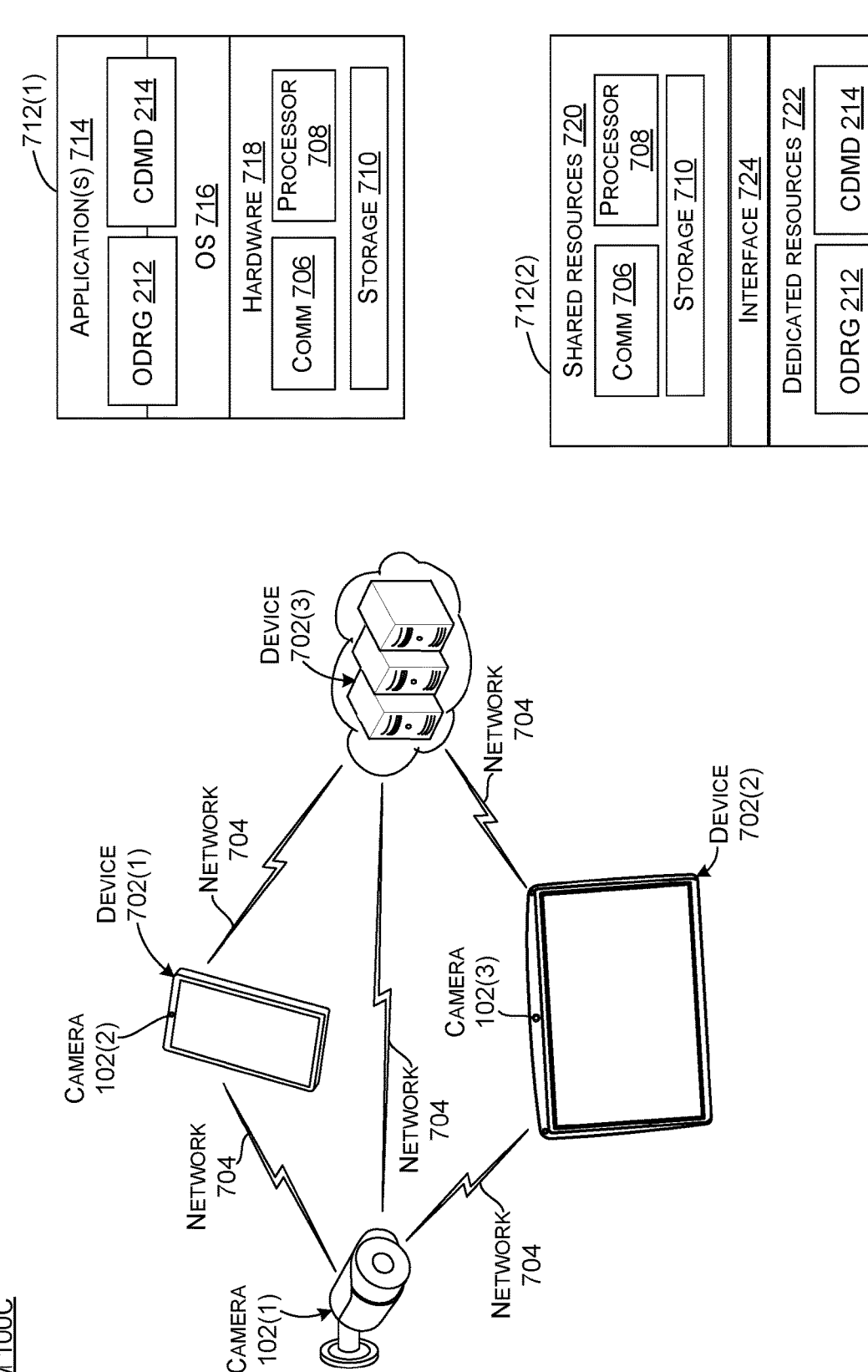

FIG. 7 shows an example system 100C that can provide object detection with reduced resource usage. System 100C can include one or more (standalone) cameras 102 and/or one or more computing devices 702. In the illustrated configuration, computing device 702(1) is manifest as a smartphone, computing device 702(2) is manifest as a tablet type device, and computing device 702(3) is manifest as a server type computing device, such as may be found in a datacenter. Note also that computing devices 702(1) and 702(2) can also include a camera 102(2) and 102(3), respectively. Similarly, cameras, such as camera 102(1) can also include components of a computing device. The cameras 102 and/or computing devices 702 can be coupled via one or more networks 704 that are represented by lightning bolts.

The cameras 102 and/or computing devices 702 can include a communication component 706, a processor 708, storage 710, an object detection resource gateway (ODRG) 212, and/or a compressed domain motion detector (CDMD) 214.

FIG. 7 shows two device configurations 712 that can be employed by cameras 102 and/or computing devices 702. Individual cameras 102 and/or devices 702 can employ either of configurations 712(1) or 712(2), or an alternate configuration. (Due to space constraints on the drawing page, one instance of each configuration is illustrated). Briefly, device configuration 712(1) represents an operating system (OS) centric configuration. Device configuration 712(2) represents a system on a chip (SOC) configuration. Device configuration 712(1) is organized into one or more applications 714, operating system 716, and hardware 718. Device configuration 712(2) is organized into shared resources 720, dedicated resources 722, and an interface 724 therebetween.

In configuration 712(1), the object detection resource gateway 212, and the compressed domain motion detector 214 can be manifest as part of the processor 708. Alternatively, the object detection resource gateway 212 and the compressed domain motion detector 214 can be manifest as applications 714 that operates in conjunction with the operating system 716 and the processor 708. In configuration 712(2), the object detection resource gateway 212 and the compressed domain motion detector 214 can be manifest as part of the processor 708 or a dedicated resource 722 that operates cooperatively with the processor 708.

In some configurations, each of cameras 102 and/or computing devices 702 can have an instance of the object detection resource gateway 212 and the compressed domain motion detector 214. However, the functionalities that can be performed by the object detection resource gateway 212 and the compressed domain motion detector 214 may be the same or they may be different from one another when comparing devices. For instance, in some cases, each object detection resource gateway 212 and compressed domain motion detector 214 can be robust and provide all of the functionality described above and below (e.g., a device-centric implementation).

In other cases, some devices can employ a less robust instance of the object detection resource gateway 212 and/or the compressed domain motion detector 214 that rely on some functionality to be performed by another device. For instance, camera 102(1) may communicate all encoded images (e.g., GOPs) to server computing device 702(3) when network resources are readily available (e.g., not a limiting and/or expensive resource). The server computing device 702(3) may have processing resources to perform decoding and detection on the encoded frames. However, the processing resources may be limiting (e.g., allocated for other tasks) and/or expensive (e.g., energy costs). The object detection resource gateway 212 and the compressed domain motion detector 214 running on server computing device 702(3) can filter the encoded frames so that only the subset of encoded frames that likely have objects of interest are processed. The server computing device could then handle the subset of decoded frames rather than all of the frames. For instance, the subset of decoded frames could be sent to a user, such as on device 702(1) for review.

In still another configuration, tablet computing device 702(2) could receive encoded frames from standalone camera 102(1) (or its own camera 102(3)). The object detection resource gateway 212 and the compressed domain motion detector 214 operating on the tablet computing device 702(2) could filter the encoded frames without decoding them to produce a subset of encoded frames that are likely to have objects of interest. The tablet computing device 702(2) could then perform decoding and detection on the subset of encoded frames. Alternatively, the tablet computing device could act as an intermediary or edge device and could transmit the subset of encoded frames over network 704 for processing on sever computing device 702(3).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 712(2) can be thought of as a system on a chip (SOC) type design. In such a case, functionality provided by the device can be integrated on a single SOC or multiple coupled SOCs. One or more processors 708 can be configured to coordinate with shared resources 720, such as storage 710, etc., and/or one or more dedicated resources 722, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes a system comprising a communication component configured to receive groups of pictures (GOPs) of a scene, the GOPs including encoded key frames and encoded non-key frames that relate to the encoded key frames, and a processor configured to determine a difference between metadata of encoded non-key frames of a current GOP to metadata of baseline non-key frames that do not include an object of interest, manage the current GOP as not containing an object of interest where the determined difference is below a threshold and expend additional resources on the current GOP where the determined difference meets the threshold.

Another example can include any of the above and/or below examples where the key frames comprise I frames and the non-key frames comprise B frames and/or P frames.

Another example can include any of the above and/or below examples where the system further comprises a camera that captured images of the scene and generated the GOPs, or wherein the system does not include the camera and the communication component is configured to receive the GOPs directly from the camera or from an intermediary device.

Another example can include any of the above and/or below examples where the processor is configured to manage the current GOP by discarding the current GOP, or wherein the processor is configured to manage the current GOP by storing the current GOP but not using network resources or processing resources on the current GOP.

Another example can include any of the above and/or below examples where the communication component is further configured to receive information about the baseline non-key frames, or wherein the processor comprises a decoder to decode encoded frames of GOPs and a detector configured to detect objects of interest in individual decoded GOPs and to identify other GOPs that do not include objects of interest as the baseline frames.

Another example can include any of the above and/or below examples where the processor is configured to expend additional resources on the current GOP where the determined difference meets the threshold for two consecutive non-key frames by communicating the current GOP via a network, and wherein the processor is configured to discard the current GOP and not communicating the current GOP via the network when the difference is below the threshold.

Another example can include any of the above and/or below examples where the processor is configured to expend additional resources on the current GOP where the determined difference meets the threshold by decoding the current GOP, and wherein the processor is configured to discard the current GOP and not decode the current GOP when the difference is below the threshold.

Another example includes a device-implemented method comprising receiving groups of pictures (GOPs) of a scene, the GOPs including encoded key frames and encoded non-key frames, obtaining metadata for baseline non-key frames of GOPs that do not include an object of interest, comparing metadata of encoded non-key frames of a current GOP to the obtained metadata of the baseline non-key frames, discarding the current GOP where a difference between the compared metadata of the encoded non-key frames of the current GOP and the obtained metadata of the baseline non-key frames is below a threshold, expending additional resources on the current GOP where a difference between the compared metadata of the encoded non-key frames of the current GOP and the obtained metadata of the baseline non-key frames meets the threshold and continuing to expend additional resources on subsequent GOPs until receiving an indication that the object of interest is no longer present in the GOPs of the scene and then resuming the comparing for GOPs received after the indication.

Another example can include any of the above and/or below examples where the receiving GOPs comprises receiving GOPS complying with real-time streaming protocol (RTSP) format, HTTP live streaming (HLS) format, web real-time communications (WebRTC) format, or secure reliable transport (SRT) format.

Another example can include any of the above and/or below examples where the receiving comprises generating the GOPs.

Another example can include any of the above and/or below examples where the obtaining metadata values comprises decoding GOPs and attempting to detect objects of interest in the decoded GOPs and labeling individual GOPs where no objects of interest are detected as baseline GOPs.

Another example can include any of the above and/or below examples where the comparing metadata values comprises generating the threshold from the baseline non-key frames and comparing the metadata of the current GOP to the threshold.

Another example can include any of the above and/or below examples where the comparing metadata values comprises generating multiple thresholds from the baseline non-key frames and comparing the metadata of the current GOP to the multiple thresholds.

Another example can include any of the above and/or below examples where the discarding comprises deleting the current GOP, or wherein the discarding comprises not communicating the current GOP over a network, or wherein the discarding comprises not expending additional processing resources on the current GOP.

Another example can include any of the above and/or below examples where the expending comprises communicating the current GOP over a network, or wherein the expending comprises expending additional processing resources on the current GOP.

Another example can include any of the above and/or below examples where the indication is received from a detector that analyzes decoded subsequent GOPs.

Another example includes a device-implemented method comprising obtaining first packet sizes of encoded non-key frames that are known to not contain an object of interest, obtaining second packet sizes of current encoded non-key frames and determining whether to expend resources on the current non-key frames by comparing the first packet sizes and the second packet sizes.

Another example can include any of the above and/or below examples where the comparing does not include key frame packet sizes.

Another example can include any of the above and/or below examples where the determining is accomplished without decoding the current non-key frames.

Another example can include any of the above and/or below examples where the comparing indicates the second packet sizes are greater than the first packet sizes, the determining whether to expend resources comprises expending resources to decode the current encoded non-key frames.

Another example includes a device-implemented method comprising obtaining first packet sizes of encoded non-key frames that are known to not contain an object of interest, obtaining second packet sizes of current encoded non-key frames and determining whether to expend resources on the current non-key frames by comparing the first packet sizes and the second packet sizes without decoding the current encoded non-key frames.

Another example can include any of the above and/or below examples where the determining comprises establishing multiple thresholds from the first packet sizes, wherein a first threshold relates to P frame packet size and a second threshold relates to B frame packet size and comparing the second packet sizes of the current encoded non-key frames comprises comparing P frames of the current encoded non-key frames to the first threshold and comparing B frames of the current encoded non-key frames to the second threshold.

CONCLUSION

The concepts described above provide comparable results with existing techniques (e.g., are equally effective at detecting objects of interest in a video stream). However, the concepts allow resources to be allocated to those frames that have a high probability of relating to a scene change (e.g., containing an object of interest). Other frames can be filtered out to reduce resource usage, such as network bandwidth, frame decoding, and/or object detection performed on decoded frames. The object detection resource gateway algorithms can effectively detect the start of scene changes based on encoded frame packet sizes. This can be achieved by examining packet sizes of encoded non-key frames, which tend to change significantly when the scene changes. In contrast, the packet sizes of key frames tend to be relatively large and consistent in size whether the scene changes or not. Inclusion of key frames in the packet size analysis can dilute the results and thereby decrease accuracy of the packet size analysis.

Although techniques, methods, devices, systems, etc., pertaining to object detection resource gateways are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A system, comprising:
a communication component configured to receive groups of pictures (GOPs) of a scene, the GOPs including encoded key frames and encoded non-key frames that relate to the encoded key frames; and,
a processor configured to:
    determine a difference between size metadata of encoded non-key frames of a current GOP to size metadata of baseline non-key frames that do not include an object of interest,
    discard the current GOP where the determined difference is below a size difference threshold derived from the size metadata of the baseline non-key frames,
    decode the current GOP and perform object detection on the current GOP where the determined difference meets the size difference threshold; and
    dynamically adjust the size difference threshold based on feedback from the object detection.

2. The system of claim 1, wherein the encoded key frames comprise I frames and the encoded non-key frames comprise B frames and/or P frames.

3. The system of claim 1, further comprising a camera configured to capture images of the scene and generate the GOPs.

4. The system of claim 3, wherein the size difference threshold is specified as a ratio of sizes of the baseline non-key frames and the encoded non-key frames of the current GOP.

5. The system of claim 1, wherein the processor is configured to decode the current GOP where the determined difference meets the size difference threshold for two consecutive non-key frames.

6. The system of claim 1, wherein the processor is configured to:
discard first subsequently-received GOPs that are below the dynamically-adjusted size difference threshold; and
decode and perform object detection on second subsequently-received GOPs that meet the dynamically-adjusted size difference threshold.

7. A device-implemented method, comprising:
receiving groups of pictures (GOPs) of a scene, the GOPs including encoded key frames and encoded non-key frames;
obtaining size metadata for baseline non-key frames of GOPs that do not include an object of interest;
comparing size metadata of encoded non-key frames of a current GOP to the size metadata of the baseline non-key frames without decoding the current GOP;
discarding the current GOP in instances when a difference between the size metadata of the encoded non-key frames of the current GOP and the size metadata of the baseline non-key frames is below a size difference threshold;

decoding the current GOP and performing object detection on the current GOP in other instances when the difference between the size metadata of the encoded non-key frames of the current GOP and the size metadata of the baseline non-key frames meets the size difference threshold; and, refining the size difference threshold based at least on whether objects are detected in individual decoded GOPs.

8. The method of claim 7, wherein the receiving GOPs comprises receiving GOPs complying with real-time streaming protocol (RTSP) format, HTTP live streaming (HLS) format, web real-time communications (WebRTC) format, or secure reliable transport (SRT) format.

9. The method of claim 7, wherein the receiving comprises generating the GOPs.

10. The method of claim 7, wherein the obtaining size metadata for the baseline non-key frames comprises decoding GOPs and attempting to detect objects of interest in the decoded GOPs and labeling individual GOPs where no objects of interest are detected as baseline GOPs, the baseline non-key frames being included in the baseline GOPs.

11. The method of claim 7, wherein the size difference threshold is specified as a ratio between sizes of the baseline non-key frames and the encoded non-key frames of the current GOP.

12. The method of claim 7, wherein the comparing size metadata comprises generating multiple packet size thresholds from the baseline non-key frames and comparing the size metadata of the current GOP to the multiple packet size thresholds.

13. The method of claim 7, wherein the discarding comprises deleting the current GOP or wherein the discarding comprises not communicating the current GOP over a network.

14. The method of claim 7, wherein the decoding and performing object detection comprises communicating the current GOP over a network to a device that performs the decoding and object detection.

15. The method of claim 7, wherein the refining is performed in response to an indication that no object of interest is present in the individual decoded GOPs.

16. One or more computer-readable storage media storing instructions which, when executed by one or more processing devices, cause the one or more processing devices to perform acts comprising:

receiving groups of pictures (GOPs) of a scene, the GOPs including encoded key frames and encoded non-key frames;

obtaining size metadata for baseline non-key frames of GOPs that do not include an object of interest;

comparing size metadata of encoded non-key frames of a current GOP to the size metadata of the baseline non-key frames without decoding the current GOP;

discarding the current GOP in instances when a difference between the size metadata of the encoded non-key frames of the current GOP and the size metadata of the baseline non-key frames is below a size difference threshold;

causing the current GOP to be decoded and object detection to be performed on the current GOP in other instances when the difference between the size metadata of the encoded non-key frames of the current GOP and the size metadata of the baseline non-key frames meets the size difference threshold; and, refining the size difference threshold based at least on whether objects are detected by the object detection in individual decoded GOPs.

17. The one or more computer-readable storage media of claim 16, the acts further comprising:

determining the size difference threshold as a threshold ratio of packet sizes of the baseline non-key frames and the encoded non-key frames of the current GOP.

18. The one or more computer-readable storage media of claim 17, the acts further comprising:

based at least on the threshold ratio, determining a packet threshold size for discarding the current GOP or causing the current GOP to be decoded and object detection to be performed on the current GOP; and employing the packet threshold size to selectively discard or cause decoding and object detection to be performed on the current GOP.

19. The one or more computer-readable storage media of claim 18, the acts further comprising:

adjusting the threshold ratio to an updated threshold ratio based at least on false positive results obtained by the object detection; and adjusting the packet threshold size to an updated packet threshold size based at least on the updated threshold ratio.

20. The one or more computer-readable storage media of claim 19, the acts further comprising:

determining the packet threshold size based at least on a mean packet size of the baseline non-key frames, a standard deviation of packet sizes of the baseline non-key frames, and a multiplier that is based at least on the updated threshold ratio.

* * * * *